J. H. WARNER.
SHOCK ABSORBING DEVICE FOR STUMP JUMP PLOWS AND THE LIKE.
APPLICATION FILED NOV. 16, 1920.
1,381,041. Patented June 7, 1921.
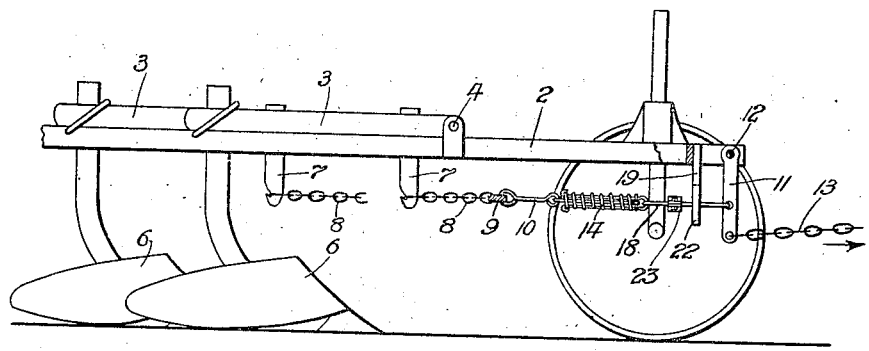
Fig. 1.
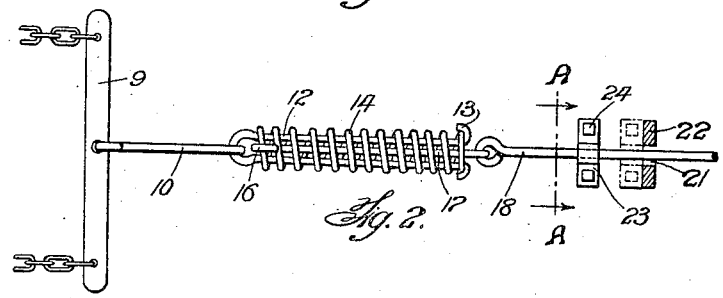
Fig. 2.
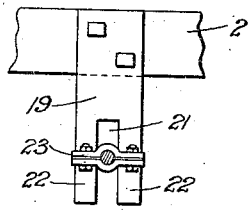
Fig. 3.
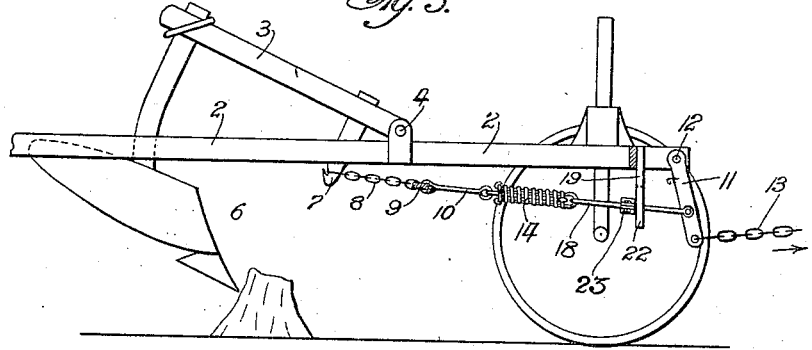
Fig. 4.
Inventor.
J. H. Warner.
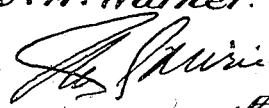
by
Atty

UNITED STATES PATENT OFFICE.

JOSEPH HARVEY WARNER, OF NHILL, VICTORIA, AUSTRALIA.

SHOCK-ABSORBING DEVICE FOR STUMP-JUMP PLOWS AND THE LIKE.

1,381,041.   Specification of Letters Patent.   Patented June 7, 1921.

Application filed November 16, 1920. Serial No. 424,550.

*To all whom it may concern:*

Be it known that I, JOSEPH HARVEY WARNER, a subject of the King of Great Britain and Ireland, and a resident of the post-town of Nhill, in the shire of Lowan, parish of Balrootan, in the county of Lowan, State of Victoria, Commonwealth of Australia, (whose post-office address is Nhill, in the said shire of Lowan,) have invented certain new and useful Improvements in Shock-Absorbing Devices for Stump-Jump Plows and the like, of which the following is a specification.

This invention relates to stump jump plows and like agricultural implements such as stump jump scarifiers or cultivators, of the type wherein the shares are carried by pivoted jump arms or share carriers to which the tension of the draft is transmitted thus tending to hold the shares down to their work and to return them to normal position after rising over a stump or other obstruction.

An objection to such implements is that when a share strikes an obstruction a sudden jerk is usually thrown upon the draft, this jerk or jar being injurious and discomforting to the draft animals if such are employed, and also entailing strains which frequently cause fracture or derangement of parts of the apparatus. Furthermore it frequently happens that a share catches beneath or behind a root or other obstruction in such a manner that the share is prevented from rising owing to the tension exerted by the draft on the share carrier, this tension tending to pull the share hard down against the obstruction.

The object of the present invention is to provide a spring device whereby shocks entailed by a share or shares striking an obstruction, are absorbed and not transferred to the draft animals, the arrangement being such that when the tension of the draft exceeds a certain limit owing to a share being caught on or arrested by an obstruction the draft tension is removed from the share carrier or carriers and transferred direct to the implement frame. The arrested share is thus permitted to rise solely against the action of spring and thereby passes freely over the obstruction without imparting sudden or excessive strain to the draft animals or the apparatus.

Various means may be employed in carrying out the invention, the following description being directed to one suitable form of device. It will be evident, however, that other contrivances differing in construction and arrangement but similar in principle and effect to that hereinafter described, may be employed without departing from the spirit and scope of the invention as defined by the claims.

Referring to the drawings which form part of this specification:—

Figure 1 is a side view showing a suitable embodiment of the invention with the parts in normal position.

Fig. 2 is a plan on an enlarged scale of the parts of the invention according to the embodiment illustrated in Fig. 1.

Fig. 3 is a transverse section on line A—A of Fig. 2, looking in the direction of the arrows.

Fig. 4 shows a share striking an obstruction and causing the draft tension to be transferred from the share carrier to the implement frame.

In the drawings the numeral 2 indicates the implement frame to which the jump arms or share carriers 3 are pivoted at 4 to rise when the respective shares 6 strike a stump or other obstruction. The pivoted share carriers 3 are usually provided with droppers or coupling members 7 to which are attached the rear ends of control chains or connections 8. The forward ends of these chains are attached to a swingletree or equalizer 9 which is connected usually by chains or draw bars with a draft attachment at the front of the implement. This draft attachment commonly takes the form of a draft lever 11 pivoted at 12 to the front portion of the implement frame and adapted to receive the rear end of the front draft chain or connection 13 which leads to the draft animals or tractor by which the implement is drawn forwardly. The direction of the draft is indicated by the arrows in Figs. 1, 2, and 4.

According to the invention the draft tension is normally transmitted to the share carriers 3 through a spring and means are provided to automatically transfer such tension from the share carriers directly to the implement frame when the spring has been flexed or strained to a certain extent through a share encountering an obstruction. Instead of the share being thus pulled hard down against the obstruction by the tension of the draft it is permitted to ride freely over the obstruction against the action of the spring which also tends to return the share to normal position after the obstruction has been passed.

As illustrating a practical embodiment of the invention I may attach to the swingle tree 9 the rear end of a rear draw bar 10 the front end of which is attached to a link 12 having hooked ends 13 passing around one end of a compression spring 14. The other end of this compression spring is embraced by the hooked ends 16 of a second link 17 which is attached to the rear end of a front draw bar 18. The front draw bar is attached at its forward end to the draft lever or attachment 11 the pull of the draft being thus transmitted through the spring 14 to the pivoted share carriers 3.

In combination with the foregoing a stop or abutment 19 is fixed to a suitable part of the implement frame 2. This abutment may, as illustrated, take the form of a depending member having an open bottomed gullet or passage 21 formed therein between a pair of fork arms 22 as in Fig. 3. The fixed stop or abutment 19 coöperates with a movable stop or abutment 23 which may be adjustable along the draw bar 18 by means of adjusting and holding bolts 24 which enable the abutment 23 to be firmly held in the desired position on the front draw bar. By thus adjusting the stop 23 along the draw bar 18 the draft tension may be transferred from the pivoted share carrier to the implement frame at the required time or at various degrees of tension.

It will be seen from the foregoing that under normal conditions the pull of the draft is received by the spring 14 which effectively absorbs all shocks consequent upon any of the shares striking an obstruction. Sudden jars on the draft animals and the implement are thus eliminated with obvious advantages. Should a share or shares become caught by a root or comparatively large obstruction so that the draft tension increases until the movable stop or abutment 23 engages the fixed abutment 22, the tension of the draft is automatically removed from the share carriers and transferred directly to the frame 2 through the member 19. The tractive pull on the share carrier being thus removed, the share is permitted to ride freely over the obstruction against the action of the spring 14. This overcomes the present disadvantage of the draft tending to pull the share hard against the obstruction thus preventing the share from rising. Immediately the affected share has passed over the obstruction the parts return to their normal position as indicated in Fig. 1.

Having now described my invention what I claim as new and desire to secure by Letters Patent is:—

1. In a stump jump plow or the like the combination with an implement frame and a pivoted jump arm or share carrier mounted thereon, of a spring through which the tension of the draft is transmitted to the share carrier, and means whereby the draft tension is automatically removed from the share carrier and transferred direct to the implement frame when the draft tension exceeds a certain limit, through the share striking an obstruction, for the purpose set forth.

2. Improvements in stump jump plows or the like, consisting in the combination with an implement frame, a pivoted jump arm or share carrier mounted thereon and draft connections for transmitting the tension of the draft to the share carrier, of a compression spring interposed in said draft connections to receive the draft tension and means whereby when the spring has been compressed to a certain degree the draft tension is automatically removed from the share carrier and transferred direct to the implement frame so that the share carrier can rise solely against the action of said spring, for the purpose set forth.

3. Improvements in stump jump plows or the like, consisting in the combination with an implement frame and a pivoted jump arm or share carrier mounted thereon, of a spring through which the draft tension is transmitted to the share carrier, means to automatically transfer the draft tension from the share carrier direct to the implement frame when the spring has been partially strained, and adjustment means whereby the draft tension may be transferred from the share carrier to the frame at various degrees of tension.

4. Improvements in stump jump plows or the like, consisting in the combination with an implement frame and a pivoted jump arm or share carrier mounted thereon, of a spring through which the draft tension is transmitted to the share carrier, and means to automatically transfer the draft tension from the share carrier direct to the implement frame after the spring has been partially strained said means including a fixed abutment carried by the implement frame and a movable abutment adapted to engage the fixed abutment when the spring has been partially strained, for the purpose specified.

5. Improvements in stump jump plows and the like consisting in the combination with an implement frame, a pivoted share carrier mounted thereon and connections for transmitting the draft tension to the share carrier, of a compression spring interposed in said connections, a movable abutment carried by said connections and a stationary abutment carried by the implement frame and adapted to be engaged by the movable abutment when the spring has been partially compressed thus removing the draft tension from the share carrier and transferring it direct to the implement frame for the purpose specified.

6. Improvements in stump jump plows and the like, consisting in the combination of an implement frame, pivoted share carriers mounted thereon, a dropper mounted on each share carrier, a draft attachment mounted on the front of the frame and adapted to receive the draft tension, a connection extending between said draft attachment and said droppers whereby the draft tension is transmitted to the share carriers, a spring interposed in said connection, a longitudinally adjustable stop carried by said connection and an abutment carried by the frame and adapted to be engaged by said stop when the spring has been partially strained for the purpose specified.

7. Improvements in stump jump plows and the like, consisting in the combination of an implement frame, pivoted share carriers mounted thereon a compression spring through which the draft tension is transmitted to the share carriers, a rear draw bar connecting one end of said spring with the share carriers, a front draw bar connected to the other end of the spring and adapted to receive the draft tension, a moving abutment carried by one of said draw bars and a stationary abutment carried by the implement frame and adapted to be engaged by the moving abutment when the spring has been partially compressed for the purpose set forth.

8. Improvements in stump jump plows and the like, consisting in the combination of an implement frame, pivoted share carriers mounted thereon, droppers mounted on the share carriers, a draft lever pivoted to the front of the frame, a front draft connection attached at its rear to said lever, a rear draw bar connected at its rear to said droppers, a front draw bar connected at its forward end to said draft lever, a compression spring interposed between said front and rear draw bars, a moving abutment carried by the front draw bar and longitudinally adjustable thereon and means carried by the frame to engage said abutment when the spring has been partially compressed by the draft tension for the purpose set forth.

In testimony whereof I affix my signature.

J. H. WARNER.

Witness:
VICTOR J. KELSON.